United States Patent Office 3,325,545
Patented June 13, 1967

1

3,325,545

PROCESS FOR PRODUCTION OF UNSYMMETRICAL TETRAHALOACETONES

William W. Levis, Jr., Wyandotte, Mich., assignor to Wyandotte Chemicals Corporation, Wyandotte, Mich., a corporation of Michigan
No Drawing. Filed July 1, 1963, Ser. No. 292,121
6 Claims. (Cl. 260—593)

The present invention relates to a process for the production of tetrahaloacetones and is more specifically concerned with a process for the highly selective conversion of 1,1,1-trihaloacetones to 1,1,1,3-tetrahaloacetones.

Highly chlorinated ketones, especially highly chlorinated acetones, are chemical intermediates of great value. For example, 1,1,1,3-tetrachloroacetone may be reduced and dehydrohalogenated to produce 1,1,1-trichloro-2,3-epoxypropane, which is in turn a useful intermediate for further reaction to produce halogenous plastic materials having a high degree of fire resistance.

Tetrahaloacetones have generally been produced by one of two methods. In the first, various reactions are utilized involving chlorinated intermediates, e.g., oxidations, Grignard reactions, or Friedel-Crafts reactions. The second method comprises the direct chlorination of unchlorinated ketones. The second method, although simpler in procedure, has the disadvantage of being unselective. As a result, in addition to production of the desired product, undesired isomers and by-products are obtained in high yields. For example, in the production of 1,1,1,3-tetrachloroacetone by the direct chlorination of acetone, the yield of the desired tetrachloroacetone is accordingly reduced by the large amount of pentachloroacetone which normally results as an undesired by-product of the reaction. In the past, to avoid production of pentachloroacetone, it has been necessary to react chlorine in very small molar ratios with 1,1,1-trichloroacetone. This has rendered the process relatively uneconomical and has made the cost of the desired 1,1,1,3-tetrachloroacetone almost prohibitive.

It is an object of the present invention to provide a novel process for the production of 1,1,1,3-tetrahaloacetones from 1,1,1-trihaloacetones. Another object is to provide a process for the production of 1,1,1,3-tetrahaloacetones which is highly selective. A further object is to provide a process for the production of 1,1,1,3-tetrachloroacetone from 1,1,1-trichloroacetone which allows employment of relatively large molar ratios of chlorine without production of unduly large amounts of undesired pentachloroacetone. Another object of the invention is to provide such a process which employs sulfuric acid as a catalyst, whereby high yields and conversions of the desired 1,1,1,3-tetrachloroacetone may be obtained. Additional objects will be apparent to one skilled in the art and still other objects will become apparent hereinafter.

According to the invention, 1,1,1,3-tetrahaloacetones are prepared by the reaction of a 1,1,1-trihaloacetone with a free halogen in the presence of concentrated sulfuric acid. The sulfuric acid acts as a highly selective catalyst to provide for maximum conversion of the trihaloacetone to the unsymmetrical tetrahaloacetone in good yields and with a minimum amount of formation of chlorinated by-products such as 1,1,1,3,3-pentahaloacetones.

The materials which may be produced by the process of the present invention are haloacetones and particularly 1,1,1,3-tetrahaloacetones, for example 1,1,1,3-tetrachloroacetone and 1-bromo-1,1,3-trichloroacetone, the corresponding fluorochloro and fluorobromo compounds, tetrahaloacetones having only one kind of halogen therein, and related tetrahaloacetones containing one or more iodine atoms.

2

The starting materials used in the process of the invention are 1,1,1-trihaloacetones. They may be produced by methods well known in the art, such as by the halogenation of monohaloacetones and 1,1-dihaloacetones.

The present process may be conveniently carried out by mixing together the 1,1,1-trihaloacetone with the required amount of concentrated sulfuric acid in a reaction container fitted with a stirrer, a gas dispenser, a thermometer well and Dry Ice-acetone reflux condenser. The reaction mixture is brought to the proper temperature and maintained at the temperature while the halogen, such as chlorine, is introduced therein and reacted.

The 1,1,1,3-tetrahaloacetone product is then separated from the residual sulfuric acid and further purified to remove unused reactant and by-products which may form, such as a 1,1,1,3,3-pentahaloacetone.

It has been found that the haloacetones produced by the process of the present invention form an insoluble hydrate in the presence of water at room temperature which traps a portion of the catalyst, rendering purification difficult. In order to avoid the hydrate formation, a limited amount of water is added to the product, and the temperature of the system is maintained at or raised to a value above that at which the hydrate dissociates or melts. The amount of water added is preferably the minimum amount necessary to dissolve the sulfuric acid, without substantial dissolution of any of the product. It has been found that this purification step may be advantageously carried out by adding only sufficient water to form about a 25% solution of sulfuric acid when all the sulfuric acid has been dissolved. At this concentration, the acid may be effectively removed without substantial loss of the desired product.

After the separation of the sulfuric acid catalyst by dilution with water and separation of the layers, the organic layer can be fractionally distilled to permit recovery of the unreacted 1,1,1-trichloroacetone, which can be recycled in another chlorination reaction, and the desired 1,1,1,3-tetrachloroacetone. The former material boils at about 75–76° C. at a reduced pressure of 100 mm. and the latter material boils at about 118–120° C. at a reduced pressure of 100 mm.

The temperature at which the reaction may be carried out is not critical. Temperatures as low as 10° C. may be used with good yield. On the other hand, temperatures as high as the boiling point of the 1,1,1-trihaloacetone starting material may be used. The chlorination of 1,1,1-trichloroacetone by the present method to produce 1,1,1,3-tetrachloroacetone has been accomplished at temperatures as high as about 135° C., the boiling point of 1,1,1-trichloroacetone.

It has been found that there is an important inter-relationship among at least three of the reaction conditions, viz., the temperature, concentration of sulfuric acid, and the molar ratio of sulfuric acid used to trihaloacetone starting material. The importance and effect of varying these conditions will be discussed in greater detail in conjunction with the examples below.

The following examples are given to illustrate the process of the present invention but are in no way to be construed as limiting.

*Example 1*

Three moles (484.5 grams) of 1,1,1-trichloroacetone were introduced into a three-necked one-liter reaction flask, fitted with a stirrer, thermometer well, Dry-Ice condenser, and gas dispenser, containing 100 grams of sulfuric acid. The mixture was stirred and heated until a temperature of 50° C. was attained. The addition of chlorine gas was then begun and was continued for a period of six hours, during which 129 grams (1.8 moles) of chlorine was added through the gas dispenser. During addition, the mixture was continuously stirred and, since the reaction was exothermic, cooled by means of an ice bath in such a manner as to maintain the temperature between 48° and 51° C. The hydrogen chloride gas generated by the reaction was allowed to escape through the condenser. After addition was complete, the crude product was transferred to a separatory funnel and the lower (acid) layer, which weighed 118 grams, was separated from the upper (organic) layer which weighed 517 grams. The organic layer was analyzed by gas-liquid chromatography and found to contain 40.5 percent of starting 1,1,1-trichloroacetone, 53.9 percent 1,1,1,3-tetrachloroacetone, and 4.4 percent pentachloroacetone. The yield of 1,1,1,3-tetrachloroacetone was 83% and the conversion was 47%.

*Example 2*

Four moles (646 grams) of 1,1,1-trichloroacetone followed by 0.69 mole (68 grams; 0.172 mole equivalent) of 99.4% sulfuric acid were introduced into a three-necked one-liter reaction flask, fitted with a stirred, a gas dispenser, thermometer well and Dry Ice-acetone reflux condenser. The reaction mixture was stirred and warmed to a temperature at 50° C. and kept at this temperature while adding 2 moles (142 grams) of chlorine through the gas dispenser over a 6-hour period. After all the chlorine had been added, the reaction mixture was cooled to 25° C. After standing overnight, the single phase reaction mixture weighed 788 grams, approximately 5 grams heavier than theory.

The Dry-Ice-acetone reflux condenser was replaced with a cold water condenser and 204 ml. of water added through the condenser. During this addition, the reaction flask was cooled and the reaction mass vigorously stirred. The two-phase reaction mixture was then warmed to 60° C. and transferred to a separatory funnel where it was kept at approximately 60° C. for one-half hour. A heavy organic layer weighing 705 grams was recovered. Distillation of the aqueous portion without a column and into a Barrett trap yielded, in a period of about 10 minutes, an additional 3 grams of organic material which was combined with the organic layer. Analysis by gas-liquid chromatography showed the organic layer to consist of 51% 1,1,1-trichloroacetone, 46.5% 1,1,1,3-tetrachloroacetone and 2.6% pentachloroacetone. The conversion to tetrachloroacetone was 42% and to pentachloracetone was 1.95%. The yields based on trichloroacetone were 95.5% for tetrachloroacetone and 4.43% for pentachloroacetone.

*Example 3*

Into a three-necked one-liter reaction flask, fitted with a stirred, a gas dispenser, a thermometer well and Dry Ice-acetone reflux condenser, 4 moles (646 grams) of 1,1,1-trichloroacetone were introduced followed by 0.69 mole (68 grams; 0.172 mole equivalent) of 99.4% sulfuric acid. The reaction mixture was stirred and warmed to a temperature of 25° C. and kept at this temperature while adding 1 mole (71 grams) chloride through the gas dispenser over a 6-hour period.

The Dry Ice-acetone reflux condenser was replaced with a cold water condenser and 204 ml. of water added through the condenser while the reaction flask was cooled and the reaction mass vigorously stirred. The two-phase reaction mixture was then warmed to 60° C. and transferred to a separatory funnel where it was kept at approximately 60° C. for one-half hour. A heavy organic layer weighing 675 grams was recovered. Analysis by gas-liquid chromatography showed the organic layer to consist of 75.1% 1,1,1-trichloroacetone, 24.0% 1,1,1,3-tetrachloroacetone and 0.96% pentachloroacetone. The conversion to tetrachloroacetone was 20.7% and to pentachloracetone was 0.7%. The yields based on trichloroacetone were 96% for tetrachloroacetone and 3.26 for pentachloroacetone.

*Example 4*

Utilizing the apparatus and general method described in Example 2, 1 mole of 1,1,1-trichloroacetone was reacted with 0.5 mole of chlorine in the presence of 0.0755 mole of 99.4% sulfuric acid. The temperature of the reaction was maintained at 133° C. The reaction was continued for about 2 hours, whereafter the sulfuric acid was diluted with sufficient water to form an solution having a concentration of 25%. The water layer was separated and the organic layer purified as in Example 2. The conversion to 1,1,1,3-tetrachloroacetone was calculated to be 37.1% and the yield was 92.3%.

*Example 5*

Chlorine (420 grams, 5.91 moles) was introduced into a mixture of 2436 grams (11.83 moles) of 1-bromo-1,1-dichloroacetone and 395 grams (four moles) of sulfuric acid at a temperature of 25° to 36° C.

Hydrochloric acid was partially removed by passing air through the product and the residue poured into 1.5 liters of water maintained at a temperature of 50° to 60° C. The lower, organic layer was separated, washed with another 1.5 liters of water maintained at a temperature of about 50° to 60° C., and dried over magnesium sulfate. The water washings were extracted with 250 milliliters of carbon tetrachloride which was then removed by distillation to leave 115 grams of residue.

This residue was combined with the main product and the combined product distilled to give 41 grams of a forerun, 120 grams of unreacted 1-bromo-1,1-dichloroacetone, 57 grams of a mixture of 1-bromo-1,1-dichloroacetone and 1-bromo-1,1,3-trichloroacetone, 1063 grams of 1-bromo-1,1,3-trichloroacetone, and 21 grams of residue. The conversion was 38% and the yield was 77%.

*Analysis of product.*—Calculated for $C_3H_2OCl_3Br$: Cl, 44.0% Br, 33.0%; and found: Cl, 44.7% Br, 32.2%.

The thus-isolated 1-bromo-1,1,3-trichloroacetone was free of sulfuric acid and other water-soluble impurities, and contained no hydrate.

The effect of varying the sulfuric acid concentration was studied in the reactions shown below in Table I as Examples 6–8. In these examples, the general reactions were carried out as in Example 2, with the exception that sulfuric acid of various concentrations was used. It was found that concentrations of sulfuric acid lower than about 97% are not completely miscible with 1,1,1-trichloroacetone and give poorer results in a chlorination reaction. Higher concentrations than 100% were found to give somewhat lower yields of 1,1,1,3-tetrachloroacetone and increased yields of pentachloroacetone. The data shown in the table in which 101.4% acid was used demonstrates this fact. A plausible explanation for this phenomenon is that a high concentration of sulfuric acid leads to sulfonation reactions and, as a result, the formation of water-soluble products. This would of course account for decreased yields. The useful sulfuric acid concentration range is about 95% to about 101.4% based on analysis by a titration procedure. A preferred acid concentration range is about 97.5% to about 100%. Reference to sulfuric acid of concentrations greater than 100% are used in the usual context demoting sulfuric acid containing free $SO_3$. In Table I, as well as in the tables which follow, TCA refers to 1,1,1-trichloracetone, TTCA refers to 1,1,1,3-tetrachloroacetone, and PCA refers to pentachloroacetone.

TABLE I.—EFFECT OF SULFURIC ACID CONCENTRATION

| Examples | TCA | | $H_2SO_4$ | | $Cl_2$ | | React. Temp., ° C. | Wt., Total Product | Conversion on TCA | | Yield on TCA | |
|---|---|---|---|---|---|---|---|---|---|---|---|---|
| | g. | Moles | Conc. | Moles/Mole* | Addn. Time | Moles/Mole* | | | TTCA | PCA | TTCA | PCA |
| 6 | 811.5 | 5.025 | 96.2 | 0.332 | 6 hrs | 0.5 | 50 | 870 | 37.6 | 2.25 | 90.8 | 5.4 |
| 7 | 646 | 4 | 97.9 | 0.339 | 6 hrs | 0.5 | 50 | 705 | 37.9 | 2.38 | 93.8 | 5.9 |
| 8 | 646 | 4 | 101.4 | 0.338 | 6 hrs | 0.5 | 50 | 685 | 39.5 | 3.15 | 85.0 | 6.8 |

*Based on moles of reagent per mole of 1,1,1-trichloroacetone.

In addition to sulfuric acid concentration, it has been found that the molar ratio of sulfuric acid used to the trihaloacetone reactant is also important. The molar ratio should be in the range of 0.01 to 0.7, with the preferred range being 0.06 to 0.4. In Table II are listed Examples 9–11 containing results of experiments utilizing the method of Example 2 in which only the mole ratio of acid catalyst to trichloroacetone was varied. Ratios in the range of 0.0865 to 0.344 were used. As is shown in the table, when the higher mole ratio values are used, the yield of 1,1,1,3-trichloroacetone is decreased only slightly while the reaction rate is increased considerably. These higher mole ratios are useful when it is desired to carry out the reaction at lower temperatures. At the lowest mole ratio of sulfuric acid catalyst, it was possible to add only one-fourth of the desired amount of chlorine during the reaction period. At the highest mole ratio of catalyst, it was possible to add the desired amount of chlorine. Thus, at a constant temperature, it was possible to add four times as much chlorine in a given reaction time by increasing the mole ratio of catalyst.

The optimum amount of catalyst used is dependent on the reaction time desired and temperature. The range of mole ratio of acid catalyst to 1,1,1-trichloroacetone may be as low as 0.01 mole (for reaction at temperatures up to the boiling temperature of the system) or 0.344 mole or higher to a maximum of 0.7 mole (for reaction at lower temperatures, even as low as 10° to 15° C.). The preferred catalyst molar concentration range is about 0.06 to about 0.4.

Various modifications and equivalents will be apparent to one skilled in the art and may be made in the method of the present invention without departing from the spirit or scope thereof, and it is therefore to be understood that the invention is to be limited only by the scope of the appended claims.

I claim:

1. A process for the production of a 1,1,1,3-tetrahaloacetone which comprises reacting a 1,1,1-trihaloacetone with chlorine in the presence of concentrated sulfuric acid, the molar ratio of said sulfuric acid to said 1,1,1-trihaloacetone being in the range of 0.01 to 0.7, said reaction being carried out at a reaction temperature within the range of 10° C. to the boiling point of said 1,1,1-trihaloacetone, and the concentration of said sulfuric acid being in the range of 95 percent to 101.4 percent.

2. A process according to claim 1, wherein the concentration of said sulfuric acid is in the range of 97.5% to 100%.

3. A process according to claim 1, wherein the molar ratio of sulfuric acid to said 1,1,1-trihaloacetone is in the range of 0.06 to 0.4.

4. A process for the production of 1,1,1,3-tetrachloroacetone which comprises reacting 1,1,1-trichloroacetone with chlorine in the presence of sulfuric acid at a tem-

TABLE II.—EFFECT OF MOLE RATIO OF CATALYST AT 50° C.

| Examples | TCA | | Catalyst | | Chlorine | | React. Temp., ° C. | Wt., Total Product | Conversion on TCA | | Yield on TCA | |
|---|---|---|---|---|---|---|---|---|---|---|---|---|
| | g. | Moles | Conc. | Mole Ratio* | Addn. Time | Moles/Mole* | | | TTCA | PCA | TTCA | PCA |
| 9 | 646 | 4 | 99.4 | 0.086 | 6 hrs | 0.125 | 50 | 660 | 12.12 | 0.293 | 93.3 | 2.25 |
| 10 | 646 | 4 | 99.4 | 0.172 | 6 hrs | 0.125 | 50 | 657 | 10.25 | 0.29 | 93.0 | 2.7 |
| 11 | 646 | 4 | 99.4 | 0.344 | 6 hrs | 0.5 | 50 | 703 | 40.25 | 2.9 | 91.0 | 6.58 |

*Moles of reagent per mole of 1,1,1-trichloroacetone.

Table III lists examples which were carried out according to the process of Example 2 in which only the temperature was varied. The data show that, as the reaction temperature increases from 25 to 50 degrees, the reaction rate increases so that twice as much chlorine can be added. Conversion to the desired 1,1,1,3-tetrachloroacetone also increases. These particular experiments were carried out in a fixed reaction time, so there is no effect shown on reaction rate. However, it has been found that lower mole ratios of catalyst may be used at temperatures of 135° C. with the reaction time being decreased to an hour or less without adverse effect on conversion and yield.

TABLE III.—EFFECT OF REACTION TEMPERATURE

| Examples | TCA | | Catalyst | | Chlorine | | React. Temp., ° C. | Wt., Total Product | Conversion on TCA | | Yield on TCA | |
|---|---|---|---|---|---|---|---|---|---|---|---|---|
| | g. | Moles | Conc. | Mole Ratio* | Addn. Time | Moles/Mole* | | | TTCA | PCA | TTCA | PCA |
| 12 | 646 | 4 | 99.7 | 0.0865 | 6 hrs | 0.25 | 25 | 672 | 18.4 | 0.5 | 96.8 | 2.63 |
| 13 | 646 | 4 | 99.7 | 0.0865 | 6 hrs | 0.5 | 50 | 709 | 41.6 | 2.22 | 94.75 | 5.08 |
| 14 | 646 | 4 | 99.7 | 0.0865 | 6 hrs | 0.6 | 75 | 703 | 41 | 2.18 | 93.25 | 4.96 |

*Moles of reagent per mole of 1,1,1-trichloroacetone.

perature in the range of 10° to 135° C., wherein the concentration of said sulfuric acid is in the range of 95% to 101.4%, and the molar ratio of said sulfuric acid to said 1,1,1-trichloroacetone is in the range of 0.01 to 0.7.

5. A process according to claim 4, wherein the concentration of sulfuric acid is in the range of 97.5% to 100% and wherein the molar ratio of said sulfuric acid to said 1,1,1-trichloroacetone is in the range of 0.06 to 0.4.

6. A process for the production of 1-bromo-1,1,3-trichloroacetone which comprises reacting 1-bromo-1,1-dichloroacetone with chlorine in the presence of concentrated sulfuric acid, the molar ratio of said sulfuric acid to said 1-bromo-1,1-dichloroacetone being in the range of 0.01 to 0.7, wherein the temperature of said reaction is in the range of 10° C. to the boiling point of said 1-bromo-1,1-dichloroacetone and wherein the concentration of the said sulfuric acid is in the range of 95 percent to 101.4 percent.

References Cited

McBee et al., Journal of the American Chemical Society, 74 pp. 3902–3904 (1952).

LEON ZITVER, *Primary Examiner.*

DANIEL D. HORWITZ, *Examiner.*